United States Patent

Rodler, Jr.

[11] 3,786,634
[45] Jan. 22, 1974

[54] CANTILEVERED HYDROKINETIC CONVERTER HAVING IMPROVED BEARING STRUCTURE

[75] Inventor: Waldo E. Rodler, Jr., San Jose, Calif.

[73] Assignee: Instrument Systems Corporation, Jericho, N.Y.

[22] Filed: July 13, 1972

[21] Appl. No.: 271,565

[52] U.S. Cl.......................... 60/361, 60/362, 60/337
[51] Int. Cl............................................ F16h 41/04
[58] Field of Search .............. 60/361, 362, 364, 330

[56] References Cited
UNITED STATES PATENTS

| 3,152,447 | 10/1964 | Waclawek | 60/362 |
| 3,204,412 | 9/1965 | Zeidler | 60/361 |

Primary Examiner—Edgar W. Geoghegan
Attorney, Agent, or Firm—Robert L. Parker et al.

[57] ABSTRACT

A hydrokinetic converter has an elongated, tubular-shaped reactor mounting shaft and an elongated central shaft coaxially mounted in the reactor shaft that has at least one exposed end extending out from a first end of the reactor shaft. A mounting structure is rigidly affixed to the opposite end of the reactor shaft from the first end and has mounting means for mounting the reactor shaft and the hydrokinetic converter to another member. A hydrokinetic bladed reactor is mounted at the first end of the reactor shaft. A first hydrokinetic bladed member is rigidly affixed to and mounted on the exposed end of the reactor shaft. An enclosing member is mounted around and encloses the reactor and the first member and comprises a hydrokinetic bladed second member mounted over the reactor shaft. The enclosing member further comprises a first end rotatably mounted and supported on the reactor shaft and a second end rotatably mounted and supported on the exposed end of the central shaft. One of the bladed members comprises an impeller and the other bladed member comprises a turbine. The hydrokinetic bladed reactor, impeller and turbine are adapted to direct fluid from the impeller through the turbine to the reactor, causing rotation of the turbine upon rotation of the impeller. First and second bearings are spaced apart in between the reactor shaft and output shaft for rotatably mounting the same. The first bearing is positioned adjacent the first end of the reactor shaft and provides the load path from the exposed end of the central for the second enclosing member and the first bladed member back to the cantilever mounted reactor shaft.

8 Claims, 1 Drawing Figure

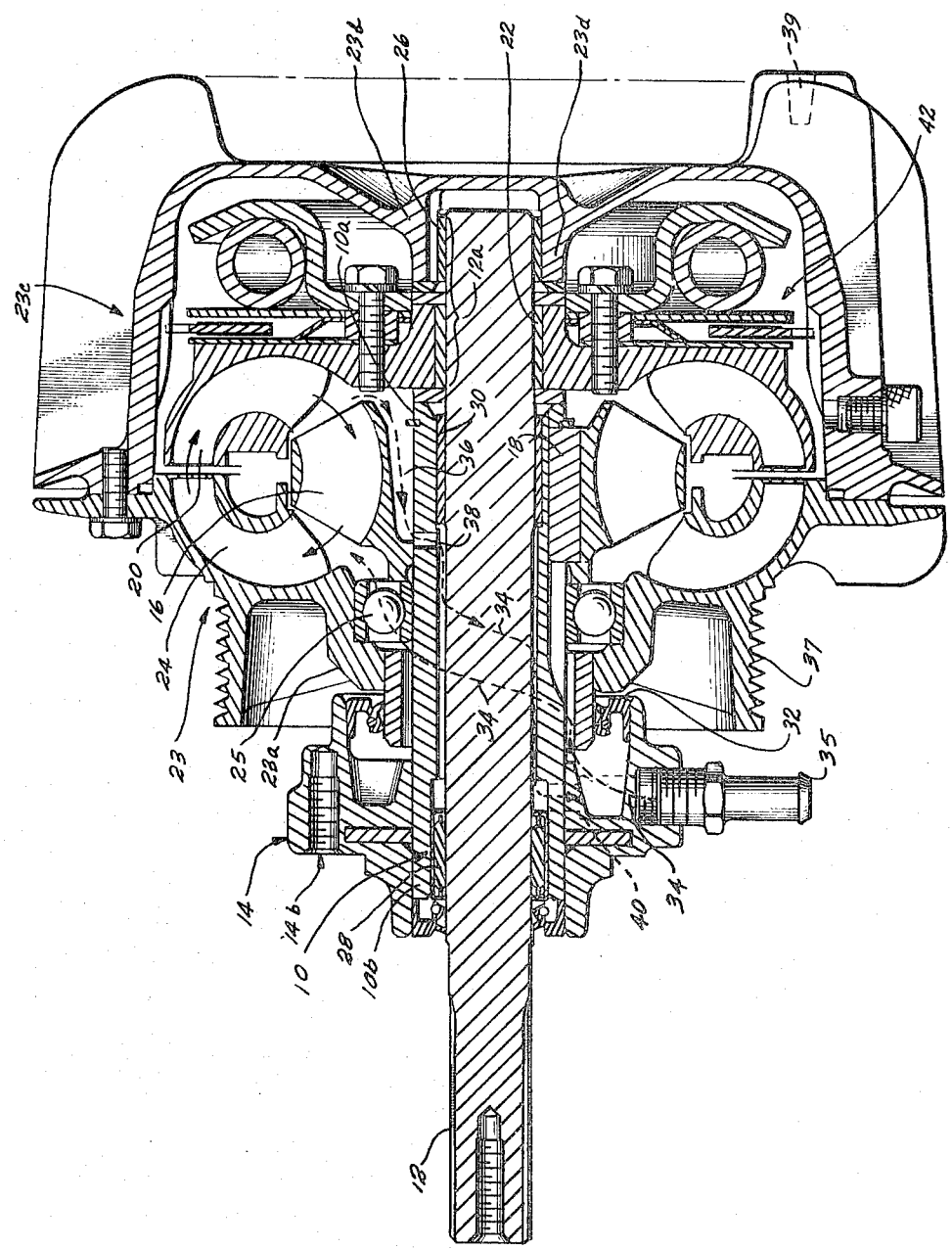

CANTILEVERED HYDROKINETIC CONVERTER HAVING IMPROVED BEARING STRUCTURE

BACKGROUND OF THE INVENTION

This invention relates to hydrokinetic torque converters suitable for cantilever mounting.

Hydrokinetic torque converters are well known in the art for use in automobiles, snowmobiles and the like. With the advent of high production, low cost vehicles, such as snowmobiles, it is essential to minimize the cost and weight of each part of the vehicle, including the hydrokinetic torque converter. However, with the many hydrokinetic converters that have been designed and are in production, it is very difficult to find ways in which to reduce cost and weight of the converter and yet maintain high quality performance.

A first proposed hydrokinetic torque converter is for an in-line connection between the output of an internal combustion engine and the input to a gear train. A tubular-shaped reactor shaft carries a reactor and a central shaft extends through the reactor shaft providing an end which is exposed from the reactor shaft on which a turbine is mounted. An enclosing member extends around the reactor and turbine and has one end rotatably mounted on the reactor and the other end connected to a shaft which in turn is connected to the output shaft of the internal combustion engine. A pair of spaced apart bearings are provided in between the reactor shaft and central shaft, one of such bearings being generally radially aligned with the reactor. Such a structure cannot be cantilever mounted because it requires a connection from the central shaft through the internal combustion engine and back to the housing of the torque converter in order to structurally support the central shaft.

With snowmobiles, it is generally desirable to provide a cantilevered type of hydrokinetic converter. A second proposed type of cantilevered hydrokinetic converter has an elongated tubular-shaped reactor mounting shaft, an elongated output shaft coaxially mounted in the reactor shaft with one end exposed and extending out from a first end of the reactor shaft. A turbine is affixed to the exposed end of the central shaft. An enclosing member is mounted around and encloses the reactor and turbine and has an impeller mounted over the reactor shaft. One end of the enclosing member is rotatably mounted and supported on the reactor shaft and the second end of the enclosing member is rotatably mounted and supported on the exposed end of the central shaft. A first bearing is provided in between the reactor shaft and central shaft at the second end of the reactor shaft and a second bearing is provided in between the second end of the enclosing member and the central shaft. Since the second end of the enclosing member and the impeller are both mounted on the exposed end of the central shaft, a housing is provided around the converter and extends around to the exposed end of the central shaft. A bearing extends in between the extended end of the housing and the second end of the enclosing member to provide a rigid support for the exposed end of the central shaft. Although such a design is durable and provides a rigid mounting for the torque converter, it requires the addition of a costly housing and careful machining to provide proper shaft alignment. Additionally, a costly bearing is required in between the supporting housing and the second end of the enclosing member. A further disadvantage is that the supporting housing adds weight and prevents effective cooling of the converter.

A third arrangement has been proposed for a cantilevered hydrokinetic torque converter. Provided is an elongated tubular-shaped reactor shaft, an elongated central shaft coaxially mounted in the reactor shaft and having an exposed end extending out from the first end of the reactor shaft. A mounting structure is rigidly affixed to the second end of the reactor shaft for cantilever mounting of the converter. A reactor is affixed on the reactor shaft at its first end. An impeller has an elongated tubular-shaped support hub mounted around the exterior of the reactor shaft and a pair of spaced apart bearings are positioned in between the reactor shaft and the hub to support the impeller.

An enclosing member is mounted around the reactor and impeller which includes a turbine. One end of the enclosing member is rotatably mounted around the impeller hub and the second end of the housing is affixed to the exposed end of the central shaft. A bushing is provided in between the first end of the enclosing housing and the hub to stabilize the housing and carry the reaction loads from the central shaft. Such an arrangement is undesirable because the large spread between the bearings in between the hub and reactor shaft causes excessive overhang of the cantilevered weight. Additionally, it is quite doubtful whether the single bushing can stabilize the entire rotating housing and carry the large reaction loads from the central shaft caused by side loading.

SUMMARY OF THE INVENTION

The present invention is directed to a hydrokinetic converter having an elongated tubular-shaped reactor mounting shaft. An elongated central shaft is coaxially mounted in the reactor shaft and has at least one exposed end extending out from a first end of the reactor shaft. A mounting structure is rigidly affixed to the opposite end of the reactor shaft from the first end and has mounting means for mounting the reactor shaft and thus the hydrokinetic converter to another member. A hydrokinetic bladed reactor is mounted at the first end of the reactor shaft. A first hydrokinetic bladed member is rigidly affixed to and mounted on the exposed end of the reactor shaft. An enclosing member is mounted around and encloses the reactor and the first member. The enclosing member includes a hydrokinetic bladed second member mounted over the reactor shaft.

Significantly, the enclosing member also has a first end rotatably mounted and supported on the reactor shaft and a second end rotatably mounted and supported on the exposed end of the central shaft. One of the bladed members is an impeller and the other bladed member is a turbine. The hydrokinetic bladed reactor, impeller and turbine are adapted to direct fluid from the impeller and through the turbine to the reactor, causing rotation of the turbine upon rotation of the impeller. Also of significance is the fact that the first and second bearings are spaced apart in between the reactor shaft and the output shaft for rotatably mounting the two and the first bearing is positioned adjacent the first end of the reactor shaft to provide a load path from the exposed end of the output shaft for the second end of the enclosing member and the first bladed member back to the cantilever mounted reactor shaft.

Such an arrangement allows cantilever mounting of the hydrokinetic converter whereas the above first mentioned prior art arrangement requires an in-line structural connection for support. The present invention also allows a significant reduction in cost and weight over the above-mentioned second prior art arrangement by eliminating the costly support housing and eliminating the need for precision machining for bearing alignment and by eliminating the need for the bearing to mount the second end of the housing. Also, by eliminating the need for the structural housing, cooling is enhanced.

The present invention provides an improvement over the third mentioned prior art arrangement in that a stabilized cantilever structure is provided which is able to carry the reactions from the central shaft caused by side loading.

BRIEF DESCRIPTION OF THE DRAWING

The single FIGURE provides a cross-sectional view of a hydrokinetic converter embodying the present invention.

DESCRIPTION OF THE PREFERRED EMBODIMENT

Depicted in the drawing is a hydrokinetic torque converter. The converter has an elongated tubular-shaped reactor shaft 10. An elongated output or central shaft 12 is coaxially mounted in the reactor shaft 10 and has at least one exposed end 12a which extends out from a first end 10a of the reactor shaft 10. A generally ring-shaped mounting structure 14 with a flat face is rigidly affixed to the second end 10b of the reactor shaft. The mounting structure 14 has mounting means 14b which comprises a plurality of threaded holes (only one shown in the drawing) in the flat face mounting structure 14 which are used for affixing the hydrokinetic converter onto the mounting structure by means of bolts (not shown).

A key hydrokinetic bladed reactor 16 is mounted on the end 10a of the reactor shaft 10. A key 18 extends in between the reactor and the reactor shaft 10 to rigidly secure the two together, preventing relative movement.

Although the present invention has been shown with the reactor keyed to the reactor shaft 10, it should be understood that the reactor may be provided with a clutch well known in the hydrokinetic art, which allows the reactor to rotate relative to the reactor shaft 10 once the angular velocity of the output shaft 12 exceeds a predetermined amount.

A hydrokinetic bladed turbine 20 is mounted on exposed end 12a of the output shaft 12. The turbine 20 is rigidly secured against relative movement to the output shaft 12 by means of splines 22 on the turbine and output shaft in a manner well known in the art.

An enclosing member is mounted around and encloses the reactor 16 and the turbine 20. The enclosing member 23 includes a hydrokinetic bladed impeller 24 which is mounted over the reactor shaft 10. The enclosing member 23 has a first end 23a rotatably mounted and supported on the reactor shaft 10. The enclosing member 23 has a second end 23b which is at the bottom of a generally bowl-shaped portion 23c which is mounted and supported on the exposed end 12a of the output shaft 12. The enclosing member 23 has its end 23a rotatably mounted by means of a ball bearing 25 onto the reactor shaft 10, and the end 23b has a ring-shaped flange portion 23d which is rotatably mounted on the central shaft 12 by means of a bearing 26 in the form of a tubular-shaped bushing 26.

An important aspect of the present invention is the way in which the load path is arranged for supporting the turbine 20 and end 23b of the enclosing member 23 on the reactor shaft 10. In accordance with the present invention, first and second bearings 28 and 30 are spaced apart and positioned in between the reactor shaft 10 and the output shaft 12. Significantly, the bearing 30 is aligned adjacent the first end 10a of the central shaft 12. In this manner, the bearing 30 provides a load path from the exposed end 12a of the output shaft 12, which is supporting the turbine 20 and the end 23b of the enclosing member 23, back to the cantilever mounted reactor shaft 10. Preferably, the bearing 30 is in the form of a bushing and the bearing 28 is a needle bearing.

What has been shown and described then is an improved hydrokinetic converter having a reactor, impeller and turbine known as a single phase single stage, torque converter. The reactor, turbine and impeller each have blades (not shown) well known in the hydrokinetic torque converter art which direct fluid generally in a path indicated by the arrows in the drawing. Fluid is placed inside of the enclosing member 23 and rotation of the impeller 24 directs fluid through the turbine 20 to the reactor 16 which in turn causes the turbine 20 to rotate and thereby rotate the shaft 12. A ring-shaped seal 32 is provided in between an axially flanged portion of the mounting structure 14 and a ring-shaped flanged portion of the end 23a of the enclosing member 23 to prevent the driving fluid from escaping from the converter.

Although not essential to the present invention, a grooved circular drive pulley member 34 is affixed on the side of the enclosing member 23 adjacent the impeller 24. A driving belt may be passed around the drive pulley member 37 for driving the enclosing member 23 and thereby the impeller 24.

Alternately, if it is desired to use the torque converter in an in-line fashion in between an engine and a driven member, a plate may be affixed to a plurality of threaded openings 39 disposed around the outer periphery of the right hand end of the enclosing member 23 as seen in the drawing. Only one opening 39 may be seen in the drawing. A plate may be affixed to the threaded openings 39 in the end of the enclosing member 23 using bolts and the plate in turn may be attached to the output shaft of an engine.

A passage system is provided to allow fluid to be passed through the hydrokinetic converter to an external cooling system and back into the hydrokinetic converter. To this end, a passage system 34 is provided, indicated generally by dashed lines, which begins with a coupling 35, the output of which opens into the chamber area on the outside of the reactor shaft 10 passing around the reactor shaft 10 and into the torus section of the hydrokinetic converter. The passage 34 extends out of the torus section of the hydrokinetic converter through a milled groove 36 at the inner diameter of the reactor 16 to a hole 38 drilled through the reactor shaft 10. The path 34 extends through the hole 38 to the space in between the output shaft 12 and the reactor shaft 10, returning through an output port 40 indicated by dash lines in the FIGURE. The groove 36 and hole 38 makes it possible to place the bushing 30 in between the output shaft and the reactor shaft without blocking the flow of cooling fluid.

In the alternative, the groove 36 and hole 38 could be eliminated by providing a groove, preferably of a spiral shape, extending around the inside of the bushing 30 from one side to the other, allowing the fluid to pass therethrough.

Although not a part of the present invention, a locking mechanism 42 is provided, including a garter spring, a locking plate and two friction members for locking the enclosing member 23 to the turbine when the angular velocity of the enclosing member 23 reaches a level where centrifugal force on the garter spring expands it and actuates the brake.

It will be evident to those skilled in the art that the central shaft 12 need not extend out of the left hand end of the reactor shaft 10. Also, the impeller and turbine members may be reversed within the scope of the invention.

Although an exemplary embodiment of the invention has been disclosed for purposes of illustration, it will be understood that various changes, modifications and substitutions may be incorporated in such embodiment without departing from the spirit of the invention as defined by the claims appearing hereinafter.

What is claimed is:

1. A hydrokinetic converter comprising:
   an elongated tubular-shaped reactor mounting shaft;
   an elongated output shaft coaxially mounted in said reactor shaft and having at least one exposed end extending out from a first end of said reactor shaft;
   a mounting structure rigidly affixed to the opposite end of said reactor shaft from said first end and having mounting means for mounting the reactor shaft and the hydrokinetic converter to another member;
   a hydrokinetic bladed reactor mounted at said first end of said reactor shaft;
   a hydrokinetic bladed turbine rigidly affixed to and mounted on said exposed end of said reactor shaft;
   an enclosing member mounted around and enclosing said reactor and said turbine and comprising a hydrokinetic bladed impeller mounted over said reactor shaft and further comprising a first end rotatably mounted and supported on the reactor shaft and a second end rotatably mounted and supported on said exposed end of said output shaft,
   said hydrokinetic bladed reactor, impeller and turbine being adapted to direct fluid from the impeller through the turbine to the reactor, causing rotation of said turbine and output shaft upon rotation of said impeller; and
   first and second bearings spaced apart in between said reactor shaft and output shaft for rotatably mounting the same, said first bearing being positioned adjacent said first end of the central shaft and providing the load path from said exposed end of said output shaft for said second enclosing member end and said turbine back to said reactor shaft.

2. A hydrokinetic converter comprising:
   an elongated tubular-shaped reactor mounting shaft;
   an elongated central shaft coaxially mounted in said reactor shaft and having at least one exposed end extending out from a first end of said reactor shaft;
   a mounting structure rigidly affixed to the opposite end of said reactor shaft from said first end and having mounting means for mounting the reactor shaft and the hydrokinetic converter to another member;
   a hydrokinetic bladed reactor mounted at said first end of said reactor shaft;
   a first hydrokinetic bladed member rigidly affixed to and mounted on said exposed end of said reactor shaft;
   an enclosing member mounted around and enclosing said reactor and said first member and comprising a hydrokinetic bladed second member mounted over said reactor shaft and further comprising a first end rotatably mounted and supported on the reactor shaft and a second end rotatably mounted and supported on said exposed end of said central shaft, one of said bladed members comprising an impeller and the other bladed member comprising a turbine,
   said hydrokinetic bladed reactor, impeller and turbine being adapted to direct fluid from the impeller through the turbine to the reactor, causing rotation of said turbine upon rotation of said impeller; and
   first and second bearings spaced apart in between said reactor shaft and central shaft for rotatably mounting the same, said first bearing being positioned adjacent said first end of the central shaft and providing the load path from said exposed end of said central shaft for said second enclosing member end and said first bladed member back to said reactor shaft.

3. A hydrokinetic converter according to claim 2 wherein said second bearing comprises a bushing in between said reactor shaft and central shaft.

4. A hydrokinetic converter according to claim 2 comprising first and second bearings for rotatably mounting the first and second ends of said enclosing member.

5. A hydrokinetic converter according to claim 3 comprising a passage for the flow of fluid for cooling purposes and comprising a bypass passage from a position in between said first member and reactor on the exterior of said reactor shaft past said bushing to a position in between said reactor and central shaft which is intermediate said first and second bearings.

6. A hydrokinetic converter according to claim 2 wherein said mounting structure comprises a portion extending from said mounting means to the second end of said enclosing member where a further mounting means is provided to enable an in-line mounting of the hydrokinetic converter with the central shaft between an engine and a driven unit.

7. A hydrokinetic converter according to claim 6 comprising a connecting member affixed to the second end of said enclosing member for connecting to the shaft of an engine or a driven unit.

8. A hydrokinetic converter according to claim 7 wherein said mounting structure comprises a first portion comprising said mounting means and second portion comprising said further mounting means and additionally comprising an interconnecting structure in between said first and second portions which is semicircular in cross-section parallel with the axis of said shafts to enable alignment of the central shaft with a shaft connected to said connecting member.

* * * * *

PO-1050
(5/69)

UNITED STATES PATENT OFFICE
CERTIFICATE OF CORRECTION

Patent No. __3,786,634__  Dated __January 22, 1974__

Inventor(s) __Waldo E. Rodler, Jr.__

It is certified that error appears in the above-identified patent and that said Letters Patent are hereby corrected as shown below:

In the Abstract: line 26, after "central" insert --shaft--;
Col. 3, line 42, "key" should be deleted;
line 43, "Akey" should be --A key--.

Signed and sealed this 13th day of August 1974.

(SEAL)
Attest:

McCOY M. GIBSON, JR.
Attesting Officer

C. MARSHALL DANN
Commissioner of Patents